J. PICHOUD.
VEHICLE SPRING.
APPLICATION FILED JUNE 1, 1918.
1,311,913.
Patented Aug. 5, 1919.
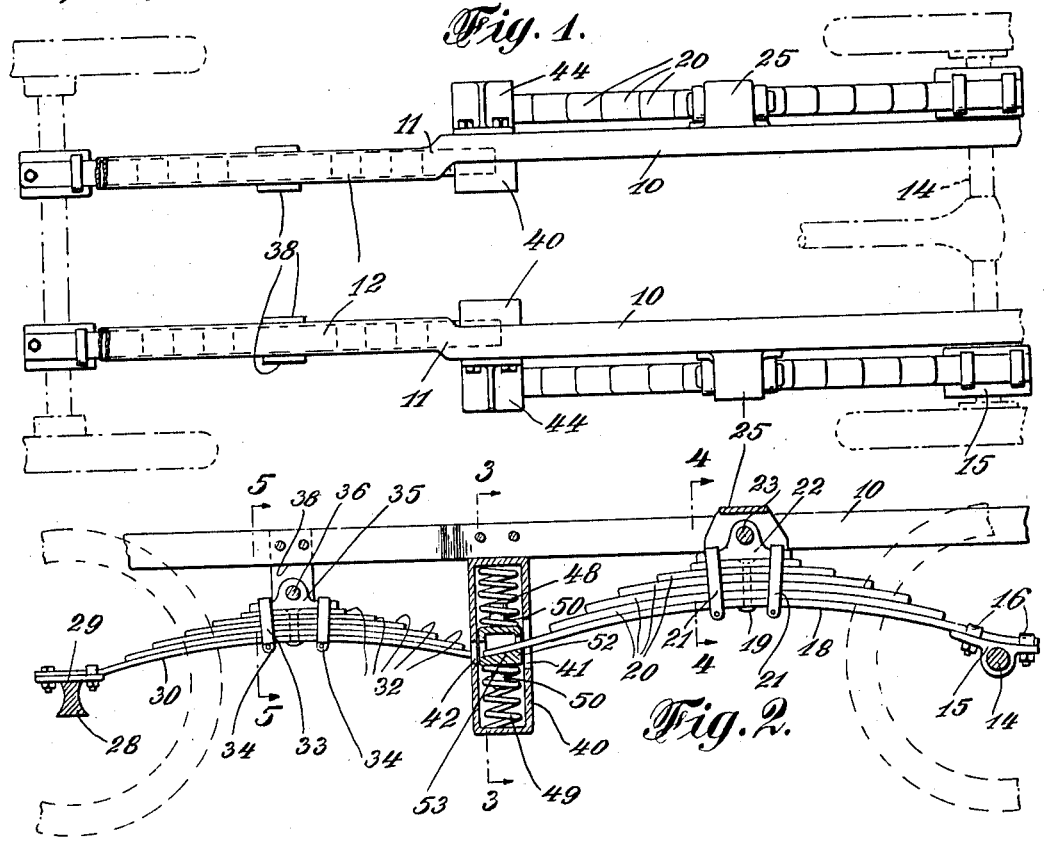
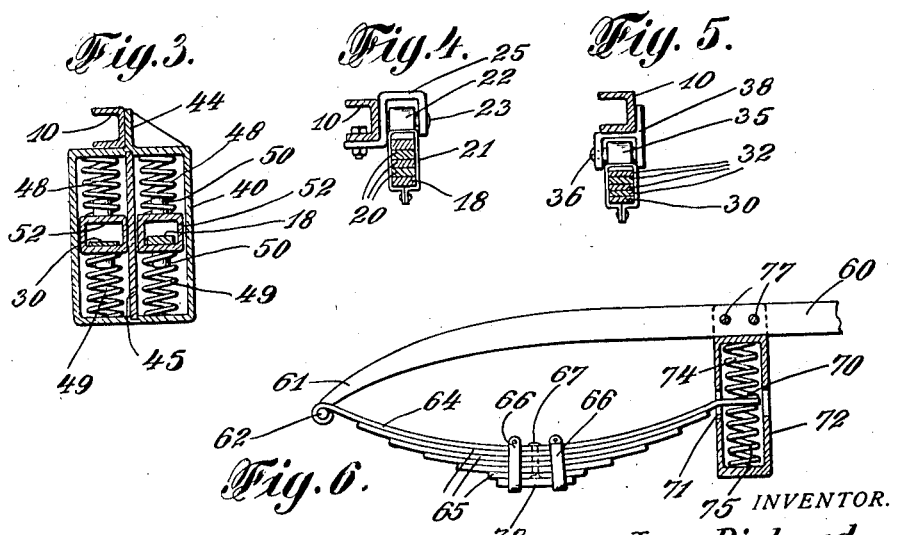
INVENTOR.
BY Jean Pichoud
his ATTORNEY

UNITED STATES PATENT OFFICE.

JEAN PICHOUD, OF NEW YORK, N. Y.

VEHICLE-SPRING.

1,311,913.  Specification of Letters Patent.  Patented Aug. 5, 1919.

Application filed June 1, 1918. Serial No. 237,812.

*To all whom it may concern:*

Be it known that I, JEAN PICHOUD, a citizen of the Republic of France, residing at New York, in the county and State of New York, have invented a certain new and useful Improvement in Vehicle-Springs, of which the following is a specification.

This invention relates to improvements in vehicle springs.

One of the principal objects of the invention is to provide means whereby springs of ordinary construction, disposed one in advance of the other, may be attached to the frame or truck of a vehicle so as to distribute the weight of the same upon the springs without the use of a special equalizer or like device.

A further object is to provide means, rigidly engaged with the truck frame, for resiliently supporting the inner ends of the main springs of the vehicles in such manner that the ends are free to move limitedly within.

A still further object is to provide a novel form of equalizer which may be used with any ordinary frame and spring structures and without change in the vehicle body itself, or the wheels on which the structure is mounted.

These and other like objects are attained by the novel construction and combination of parts hereinafter described and shown in the accompanying drawing, forming a material part of this specification, and in which:

Figure 1 is a top plan view illustrating my invention, showing the lower elements of the truck frame, in connection with conventional types of springs mounted upon the axle of the vehicle;

Fig. 2 is a partial side elevational and vertical sectional view taken through the same;

Fig. 3 is a transverse sectional view taken on line 3—3 of Fig. 2;

Fig. 4 is a similar sectional view taken on line 4—4 of Fig. 2;

Fig. 5 is a like transverse sectional view taken on line 5—5 of Fig. 2; and

Fig. 6 is a fragmental side elevational view showing a form of the attaching device as applied to an automobile frame.

In the construction indicated, which is largely diagrammatic, the numeral 10 indicates a pair of oppositely disposed beams constituting the frame of the vehicle truck, the beams being of any desired cross section, as the channel herein indicated, which are bent inward or toward each other at 11, forming extensions 12, which are disposed in parallel, as are the main portions 10.

In the construction indicated, there is engaged with the rear shaft 14, a bracket or seat 15, to which are secured by clips 16, a lower leaf 18, secured to which, by the rivet 19, are the successive layers 20, of an arcuate or semi-elliptic spring, the same being held by clips 21 to a bracket 22, pivotally engaged by the pin 23 with a yoke 25, securely bolted to the beam 10. Similarly engaged with the front axle 28, by the seat 29, is the lower leaf 30 of the front spring, the other leaves or layers of the spring being arranged thereabove, as is common, and held by the rivet 33, and clips 34, to a bracket 35, pivoted upon the pin 36, secured in the bracket 38 to the extensions 12 of the beam.

The inner end of both the lower leaves 18 and 30 pass into a bolster or casing 40, through openings 41 and 42, formed in opposite sides, the casing being substantially rectangular in cross section and rigidly secured by a bracket 44 to the beam 10 as can best be seen in Figs. 2 and 3. A central partition 45 is arranged within the casing 40, forming compartments in the outermost of which are contained a pair of coiled compression springs, respectively 48 and 49, their inner ends encircling pins 50 extending from the bottom and top of a loosely mounted block 52 containing an opening into which the extreme front end of the lower leaf 18 extends, the same resting upon a beveled seat 53, the arrangement being such that as the springs 18 are stressed under a load, the ends extend through the openings 41 and 42, sliding on the surface of the seat 53.

A similar but oppositely disposed block is slidably arranged in the other side of the casing 40.

In operation, the load being applied to the beam 10, is obviously transmitted to the center of the springs, and the inner ends by reason of resting upon the inclined surface 53, move freely through the blocks 52 in either direction, one equalizing the effect of the other, forming an effective and durable device for the purpose, while the supplementary springs 48 and 49 serve for cushioning any shock or jar which might be transmitted, rendering the action of the vehicle easy and agreeable.

In the modification shown in Fig. 6, the beam 60 is shown with an arcuately bent end 61, carrying a pin 62, to which is secured the upper leaf 64 of a reversely positioned semi-elliptic spring, the several leaves 65 of which are securely held in proper relation by the clips 66 and bolt 67, while the opposite extending end 70 of the upper leaf, extends into an opening 71, formed in the bolster or casing 72, and rests between the ends of coiled compression springs 74 and 75, respectively at the top and bottom of the extending end, the bolster having a through opening through which the end of the springs may be extended. The bolster is secured by rivets 77 to the beam 60, while the attachment between the springs and the axle is obviously made by means of the bracket 78, at the center of the lower leaf. It will be obvious that the rear springs also may be made and arranged according to this modification, each spring having its own bolster and spring connections.

Having thus described my invention, what I claim as new and desire to secure by Letters Patent, is:

1. In vehicle springs, a spring secured to a vehicle and having its outer end attached thereto, the inner end of said spring being positively free, and means for supporting said free end which includes a bolster having a vertically movable block therein having a slideway adapted to receive and support said free end, resilient means supporting said vertically movable blocks in said bolster, said bolster being provided with a fixed slide adjacent and a short distance below the end of the spring when the same is held in normal position by the resilient means which support said movable blocks.

2. In vehicle springs, a spring secured to a vehicle and having its outer end attached thereto, the inner end of said spring being positively free, and means for slidably supporting said inner end which includes a bolster having a vertically movable block therein provided with an open slideway for said inner end, resilient means supporting said vertically movable blocks in said bolster, said bolster having openings therethrough adapted to receive the end of the said spring the bottom wall of one of said openings being a relatively slight distance below the end of the spring, for the purpose set forth.

3. In vehicle springs, springs arranged upon the frame of a vehicle one in advance of the other, the outer ends of said springs being attached respectively to the front and rear axles of the vehicles, the inner ends thereof being positively free, and resilient means which includes a bolster having vertically movable resiliently supported blocks provided with open slideways formed therein to separately receive and support said inner ends.

4. In vehicle springs, springs secured to the frame of a vehicle one in advance of the other, the outer ends of said springs being attached respectively to the front and rear ends of said axles of the vehicle, the inner ends of said springs being free, a bolster attached to said springs being free, a bolster attached to said bolster frame, movable blocks within said bolster frame adapted to receive the free ends of said springs, and resilient means for supporting said blocks in operative position.

5. In a spring, the combination with a pair of opposed springs having rigid supports at their outer ends, and a beam pivotally engaged with the center of said springs, of a bolster fixed centrally of said beam, said bolster having compartments into which the adjacent ends of said springs enter, blocks freely slidable within the mentioned compartment, said blocks being hollow and having beveled seats formed therein receptive of the ends of said springs, and pairs of compression springs mounted in said compartments, above and below said blocks whereby the effect of said springs is materially cushioned.

6. In a spring, the combination with a truck beam, of a spring pivotally connected with said beam at its center, a rigid support for one end of said spring, a flexible support for the free end of said spring, a bolster on which said flexible support is mounted, said bolster being rigidly engaged to the beam, and an open slideway formed upon said bolster and combining with said support permitting the extending end of said spring to move longitudinally therein and extend therethrough.

7. In a truck spring, the combination with a rigid beam and springs pivotally mounted upon said beam, of fixed supports at the outer end of said springs, a hollow bolster attached to said beam, said bolster having openings through which the adjacent inner ends of said springs may enter to slide therein, an equalizing block slidable vertically in said bolster, resilient means interposed between said block and said bolster, and inclined slideways formed in said blocks for the inner ends of the said springs.

8. In a truck spring, the combination with a rigid beam forming the base of said truck, springs mounted thereon, suitable connections between the outer ends of said springs and the axle of the truck, a hollow housing engaged with said beam, said housing having side openings through which the inner free ends of said springs may extend, blocks having inclined slideways adapted to receive the free ends of said springs, said slideways being in alinement with said openings; and means for resiliently engaging opposite sides of said blocks, so as to resist flexure in either direction, said slideways and side openings permitting the free ends of said springs to pass therethrough when under stress.

9. In vehicle springs, springs arranged upon the frame of a vehicle one in advance of the other, the outer ends thereof having rigid supports, the inner ends thereof being free, and a bolster arranged between said springs and being provided with members having individual oppositely inclined slideways, said members being capable of vertical movement in said bolster and adapted to receive and support the opposing free ends of said springs, and resilient means supporting said members in the bolster.

10. In vehicle springs, springs arranged upon the frame of vehicle, the outer ends thereof having rigid supports, the inner ends thereof being free, a bolster arranged between said springs, blocks in said bolster having individual slideways therein for the free end of each of said springs, said slideways being inclined in opposite directions with respect to each other, and capable of independent vertical movement in said bolster, and resilient means supporting said slideways in the bolster.

11. In vehicle springs, springs arranged upon the frame of a vehicle one in advance of the other, the outer ends thereof having rigid supports, the inner ends thereof being free, a bolster arranged between said springs and being provided with members having individual oppositely inclined slideways, said members being capable of vertical movement within said bolster to receive and support the opposing free ends of said springs, and resilient means in said bolster adapted to engage and support said free ends.

12. In vehicle springs, springs arranged upon the frame of a vehicle one in advance of the other, the outer ends thereof having rigid supports, the inner ends thereof being free, a bolster arranged between said springs, blocks in said bolster having individual oppositely inclined slideways to receive and support the opposing free ends of said springs, expansion springs bearing downwardly from the top of the bolster upon the said blocks, and resilient means interposed between the bottom of said bolster and block.

In testimony whereof, I have signed my name to this specification in the presence of a subscribing witness, this 27th day of November, 1917.

JEAN PICHOUD.

Witness:
GEO. N. VINTZAN.

Copies of this patent may be obtained for five cents each, by addressing the "Commissioner of Patents, Washington, D. C."